Oct. 10, 1944.  J. T. RYAN ET AL  2,360,019
TURNBUCKLE AND WRENCH THEREFOR
Filed March 5, 1942  2 Sheets-Sheet 2
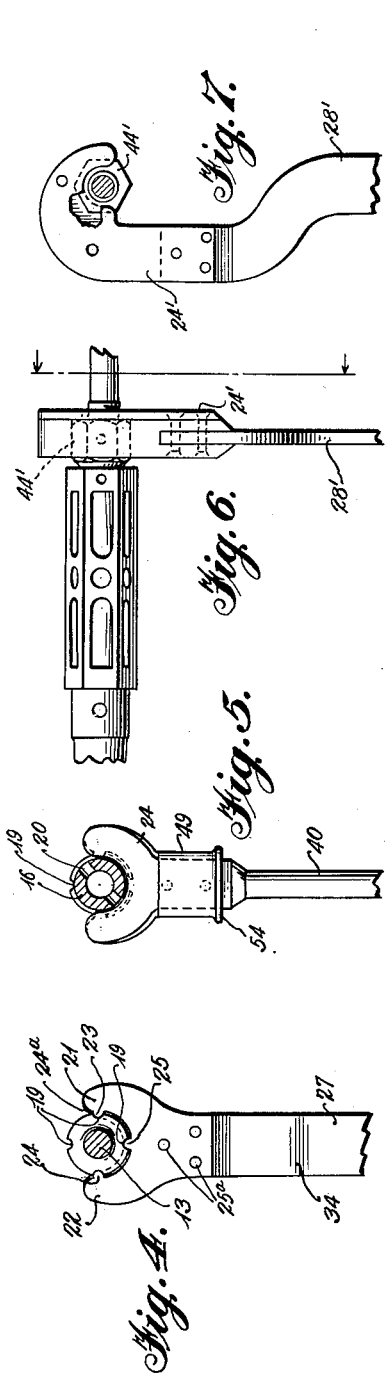
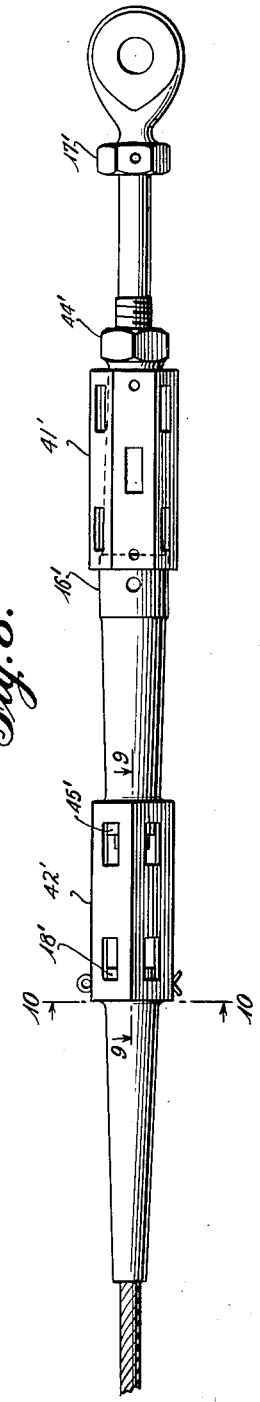
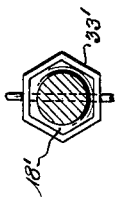
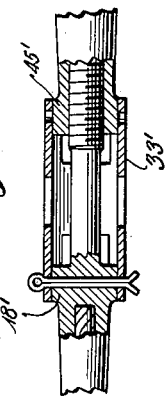
Inventors
*James T. Ryan* and
*Homer Robinett*
By Nelson J Jewitt
Attorney Patented Oct. 10, 1944

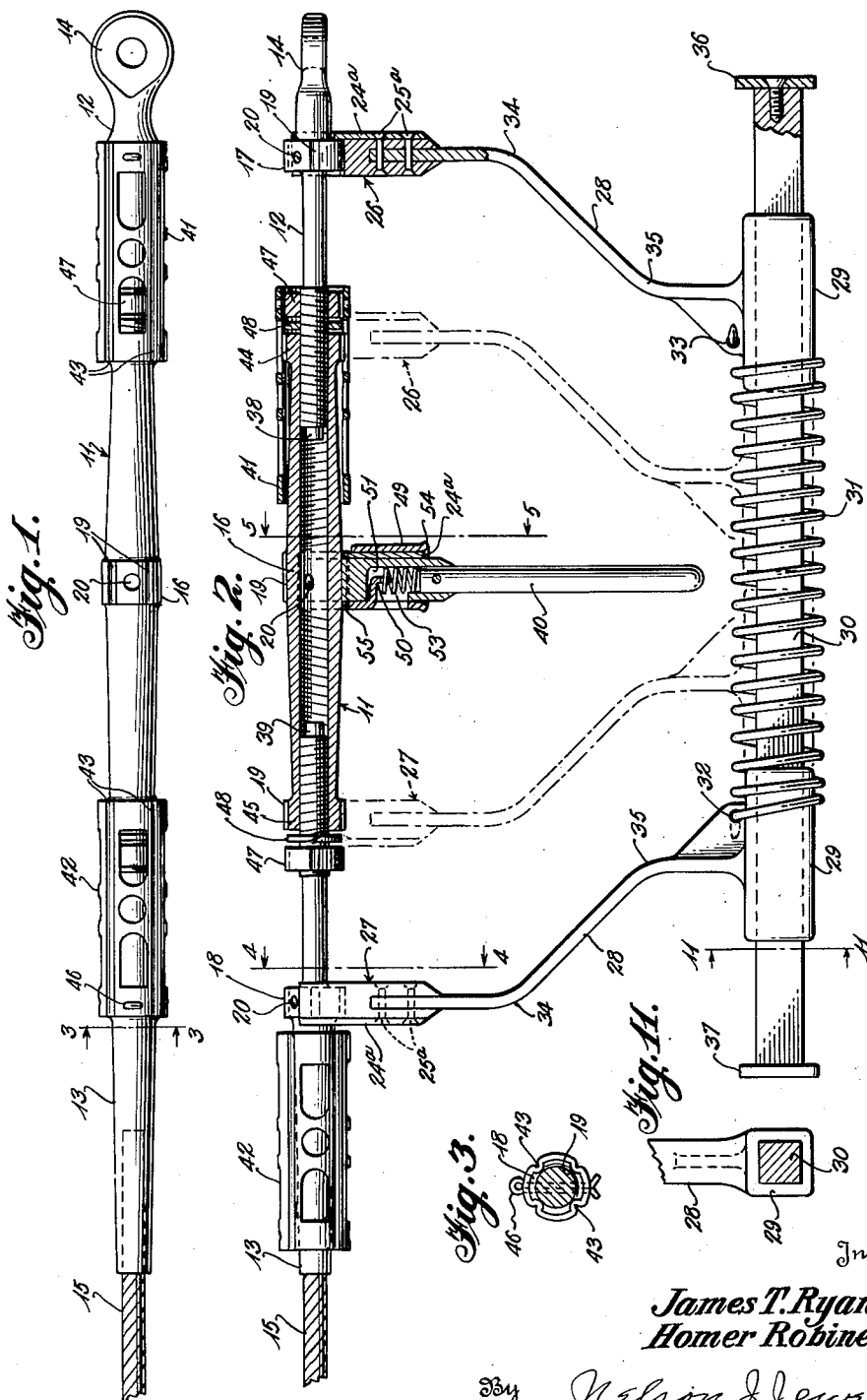

2,360,019

UNITED STATES PATENT OFFICE 2,360,019

TURNBUCKLE AND WRENCH THEREFOR

James T. Ryan, Santa Monica, and Homer Robinett, West Los Angeles, Calif.; said Robinett assignor to said Ryan Application March 5, 1942, Serial No. 433,508

3 Claims. (Cl. 287—60)

The invention relates to turnbuckles particularly adapted for use in the structure of airplanes.

In the modern airplane a large number of cables are provided internally of the wing structure by way of bracing acting in tension, and it is essential that the turnbuckles once adjusted to place the proper tension upon the cables shall not unscrew to slacken tension.

It is the present practice to lock the turnbuckles from such slackening movement by passing wires through a hole in the central turnbuckle body and through an end member, and to wind the wires about the stem to prevent unscrewing, but it is obvious that such practice will not prevent the partial revolution of the turnbuckle in service, with consequent slight loss of tension.

It is an object of the present invention to provide locking means which shall take the place of the presently used wire and which yet may permit of inspection to assure that the turnbuckle has been properly applied.

The usual airplane specifications provide that the turnbuckle shall be screwed home to such an extent that not more than three turns of the thread upon each of the end members shall remain exposed and the present invention provides the means to see that this specification is met.

It is an object of the invention to provide a turnbuckle having a novel form of wrench engaging members for application of the wrenches and of the locking means to provide a wrench tool which will assist in the assembly of the turnbuckle for the convenient adjustment thereof.

Further objects of the invention will appear from the following description when read in connection with the accompanying drawings showing illustrative embodiments of the invention, and wherein:

Figure 1 is a side elevation of a turnbuckle of the invention shown as provided with a cable connected at one end and an eye connection at the other end thereof;

Fig. 2 is a side elevation of the structure of the invention showing the turnbuckle body in longitudinal section and showing one form of the wrench means of the invention in place thereon;

Fig. 3 is a transverse section on line 3—3 of Figure 1 showing a cotter pin in place;

Fig. 4 is a detail transverse section on line 4—4 of Figure 2;

Fig. 5 is a detail transverse section on line 5—5 of Figure 2;

Fig. 6 is a detail side elevation showing the application of a modified form of wrench as applied to the turnbuckle structure of Figure 8.

Fig. 7 is a transverse section an line 7—7 of Figure 6;

Fig. 8 is a side elevation similar to Figure 1 of a second form of the invention;

Fig. 9 is a detail longitudinal section on line 9—9 of Figure 8;

Fig. 10 is a transverse section on line 10—10 of Figure 8; and

Fig. 11 is a detail transverse section on line 11—11 of Figure 2.

As shown in Figure 1 the central body of the turnbuckle is shown at 11 comprising a hollow member internally threaded with right and left hand threads respectively to coact with the attaching members 12 and 13. For purposes of illustration, the member 12 is shown as provided with an eye member 14 at one end and with a cable 15 at the remaining end entering a hollow end of the member 13 and brazed or swaged therein in the usual manner.

The member 11 is shown as tapering in both directions from the central wrench engaging portion 16 and the members 12 and 13 are each shown as formed with a similar wrench-engaging portion 17 and 18 which are shown as being formed of the same overall dimension as is the portion 16.

In accordance with the invention the wrench-engaging portions 16, 17, and 18 are formed in cross section in the manner shown in Figures 3, 4, and 5, namely with a plurality of slots or grooves 19, shown as four in number for convenience. These members are also shown as provided with perforations 20 for reception of a pin for causing revolution of the members or for holding the members from revolution in locations where it is not convenient to use a wrench and in a well known manner, also for reception of cotter pins as described below.

To coact with the grooves 19 the wrench of the invention is shown as provided with a pair of spaced jaws 21, 22 each bearing a rib 23, 24 and a third rib 25 is shown at the junction of the jaws 21, 22.

The member 13 is also shown as tapered away from the wrench engaging member 18 thereof. Due to the taper and cross-sectional dimension of the parts the wrench of the form of Figures 4 and 5 may be slipped upon the smaller portion of the members 11, 12, and 13 and the ribs of the wrench may be entered into the grooves 19 by lateral motion, whereupon the wrench cannot fall off from the turnbuckle structure during the subsequent manipulation thereof.

In order to avoid the necessity for care in the application of the wrenches to the structure each wrench is shown as provided with a plate 24a shown as secured to one side thereof by means of rivets 25a although the plate may obviously be welded in place if desired.

To assist in the manipulation of the parts in application of the turnbuckles 12, 13, to the central body, two of the wrenches 26, 27 are shown mounted on arms 28 each projecting from a sleeve 29 which sleeves are slidably mounted upon a bar 30. The bar 30 is desirably formed non-circular in cross section, shown as square for purpose of illustration, in order to preserve the parallelism of the arms 28.

To urge the wrenches 27, 28 toward the body 11 in use, there is shown a spring 31 acting in tension, and anchored at its ends at 32, 33 to the arms 28. The wrench assembly 26, 27, 28 with the bar 30 must, at times be manuipulated in a confined space. To shorten its overall length, while permitting sufficient separation of the wrenches 26, 27, the arms 28 are shown with offsetting reverse bends 34, 35, whereby the necessary overall length of the bar 30 is reduced to a minimum.

The bar 30 is shown as provided with end buttons 36, 37 to prevent separation of the sleeves 29, 30 from the bar. In order to allow the excess length of the bar, in any position of the sleeves 29, 30 less than their maximum separation, to project entirely from either of the sleeves, the bar 30 is freely slidable in the sleeves.

The ends of the members 12, 13 are shown as each formed with a pilot tip 38, 39 which fits inside of the internal screw threads of the body 11. Therefore the wrench 26, for instance, may be slipped upon the wrench member 17 of the terminal 12 with the pilot 38 resting in one end of the body 11 and the terminal 13 may then be slipped into the wrench 27, the wrenches being separated against the resistance of the spring 31 and the tip 39 may be inserted in the remaining end of the body 11 when the parts will be held in this position by pressure of the spring 31, without further attention on the part of the operator, who may then apply the wrench 40 to the central portion 16 which may be revolved by means of the latter wrench to cause an even entry of the two terminals into the body 11, the revolution of the two members being prevented by the hand of the operator engaging the bar 30 and the spring 31.

To lock the parts in adjusted position there are shown locking members 41, 42 comprising tubular sleeves with their walls deformed to provide internally extending ribs 43 as shown in Figure 3.

These sleeves during the adjustment of the turnbuckle may be slipped either upon the body 11, or where a cable attachment is used as shown at 13, 15, they may be slipped outwardly upon the cable. After the adjustment of the turnbuckle these sleeves may be slipped to the position shown in Figure 1 with the ribs 43 in engagement with the grooves 19 in the end members 44, 45 of the central body 11, which are formed with the same contour as the members 16, 17, 18, in which position a cotter pin 46 may be passed through the openings 20 in the terminal members to lock the parts against revolution. If desired a lock nut 47 and lock washer 48 may be applied to each terminal 12 and 13 after the tension of the cable has been adjusted to provide additional security thereof. This provision in most instances will be unnecessary because of the effectiveness of the locking means 41, 42.

The central wrench member 40, in addition to the plate 24a is shown as provided with a slidable sleeve 49 having a portion 50 struck in from its material entering a recess 51 in the wrench body and coacting with a spring 52 in the recess to urge the sleeve toward the position shown in Figure 2. The ends of the sleeve are shown as provided with outturned portions 53, 54 for engagement by a thumb and finger of the user to compress the spring 53 to retract the side plate 55 carried by the sleeve which plate when in extended position laps past the side of the wrench engaging portion 16 opposite the plate 24a so that the wrench 40 cannot possibly become disengaged by longitudinal movement upon the body and therefore the body may be revolved freely by use of the wrench 40 without any attention being required on the part of the operator to keep the wrench in engagement.

In the form shown in Figures 6 to 10 inclusive the wrench engaging portions 16', 17', and 18' as well as the portions 44', 45' are shown as hexagonal to coact with a hexagonal wrench in the form shown in Figure 7. As there shown the hexagonal wrench is provided with a side plate 24' to assist in the placing of the wrench for use and also the coaction of the arm 28' in the manner already described in the case of the form shown in Figure 2. In this form of the invention the sleeves 41', 42' are formed hexagonal to coact with the turnbuckle contour.

In order that an inspector may be able to ascertain that the placing of the turnbuckle meets specifications and also to lighten the structure, the sleeves 41, 42, and 41', 42' are shown as formed with openings through which the inspector may ascertain that the parts are properly assembled. By provision of these openings not only is inspection permitted but the sleeves are lightened to such an extent that they will not weigh appreciably more, and may be even made of less weight than, the weight of the locating wires that are presently being used in structures of this type upon airplanes.

In addition to the inspection openings provision is made for the inspection of the proper assembly by the sense of feeling where the location of the turnbuckle does not permit of visual inspection. To this end the sleeves 41, 42 and 41', 42' are made of such length that if the turnbuckle has been assembled with just three threads exposed, the length of the sleeve will lie in the position best shown at the left of Figure 8.

Obviously, without objection, the turnbuckle may be installed so that the entire amount of the threads upon the terminals disappear upon the interior of the central body 11, in which case the sleeves will overlap upon the central body, which fact may also be ascertained by the sense of feeling.

The shape and form of the parts are such that in the structure shown in Figures 1 and 2 both sleeves may be placed upon the cable clear of the device and in this event the sleeve 41 may be slipped completely across the structure into its position.

The use of the eye upon one terminal and a cable upon the other terminal as shown in the drawings is for purpose of illustration only it being obvious that a cable 15 may be utilized at both its terminals. In the use of a hexagonal wrench and coacting part to be turned, it is well known that a sufficient strain may be placed upon the wrench to cause it to round the part sought to be turned, with consequent failure. With the form of wrench and coacting part shown in Figures 1 to 5 inclusive, three ribs are present upon the wrench coacting each with a groove upon the part to be turned, thereby providing added strength to apply the turning force to the part. Also by provision of this form of contour the structure can be produced by much less grinding in the process of manufacture than can the hexagonal wrench engaging portions of Figures 6 to 10 inclusive and of the present usual practice.

It is obvious that many of the advantages of the invention may be secured utilizing Stillson type wrench members in engagement with plain circular surfaces on the attachment members 12 and 13 and on the body 11, or any of them.

Minor changes may be made in the physical embodiments of the invention within the scope of the appended claims without departing from the spirit of the invention.

We claim:

1. A turnbuckle structure comprising, in combination: a turnbuckle body formed with excess diameter wrench-receiving end portions; said portions being of non-circular cross section and each provided with a plurality of longitudinal wrench grooves; threaded attachment members having right and left-handed thread screw coaction with said body; said members each formed with wrench grooves symmetrical with said first named grooves; and tubular locking sleeves slidable to telescope respectively over adjacent wrench receiving portions of the body and the respective members; said sleeves formed with internal ribs to enter said grooves; whereby to lock the attachment members in adjusted position relative to said body.

2. The structure of claim 1 in which said threaded attaching members are formed with pilot tips of reduced diameter to slide within the threaded end portions of the body.

3. The structure of claim 1 in which the body is formed with a central non-circular portion of diameter and contour similar to that of the end portions; and the sleeves are freely slidable over the entire assembly.

HOMER ROBINETT.
JAMES T. RYAN.